(12) United States Patent
Pham et al.

(10) Patent No.: US 7,588,655 B2
(45) Date of Patent: Sep. 15, 2009

(54) MANDREL WITH DIFFERENTIAL IN THERMAL EXPANSION TO ELIMINATE WRINKLES IN PLY

(75) Inventors: Doan D. Pham, Renton, WA (US); Mark W. Tollan, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 645 days.

(21) Appl. No.: 10/904,709

(22) Filed: Nov. 24, 2004

(65) Prior Publication Data

US 2006/0108055 A1 May 25, 2006

(51) Int. Cl.
B32B 37/10 (2006.01)
B29C 70/34 (2006.01)
B29C 70/56 (2006.01)
B29C 33/76 (2006.01)

(52) U.S. Cl. .............. 156/227; 156/245; 156/267; 156/285; 264/231; 264/313

(58) Field of Classification Search ............ 156/160, 156/163, 196, 221, 222, 245, 267, 285, 286, 156/307.1, 494, 499, 580, 581, 583.1, 583.3, 156/227; 264/231, 241, 313, 316, 337; 52/729.1, 52/729.2, 729.5; 428/119, 120
See application file for complete search history.

(56) References Cited

U.S. PATENT DOCUMENTS

| 2,517,698 | A | * | 8/1950 | Muskat | 156/85 |
| 2,739,350 | A | | 3/1956 | Lampman | |
| 3,795,559 | A | * | 3/1974 | Horn et al. | 156/152 |
| 4,338,381 | A | * | 7/1982 | Rogers | 428/575 |
| 4,475,976 | A | * | 10/1984 | Mittelstadt et al. | 156/286 |
| 4,512,837 | A | * | 4/1985 | Sarh et al. | 156/189 |
| 4,576,849 | A | | 3/1986 | Gardiner | |
| 4,786,456 | A | * | 11/1988 | Witte | 264/285 |
| 5,096,525 | A | * | 3/1992 | Engwall | 156/196 |
| 5,348,602 | A | * | 9/1994 | Makarenko et al. | 156/161 |
| 5,387,098 | A | * | 2/1995 | Willden | 425/393 |
| 5,538,589 | A | * | 7/1996 | Jensen et al. | 156/581 |
| 6,264,868 | B1 | * | 7/2001 | Marchant | 264/221 |

FOREIGN PATENT DOCUMENTS

| GB | 842815 | 7/1960 |
| JP | 58076217 | 5/1983 |
| WO | WO9606726 | 3/1996 |

* cited by examiner

Primary Examiner—Michael A Tolin
(74) Attorney, Agent, or Firm—Ostrager Chong Flaherty & Broitman P.C.

(57) ABSTRACT

An aircraft stringer lay-up assembly is provided comprising a first mandrel element having a first mandrel material with a first mandrel coefficient of thermal expansion. A composite ply assembly is laid up onto the first mandrel element to generate a primary lay-up surface. The composite ply assembly comprises a first primary fold-over portion folded onto to the first mandrel right end surface. A second primary fold over portion folds over to the first mandrel left end surface. The first mandrel coefficient of thermal expansion is adapted such that the first mandrel is movable between a first mandrel normal condition and a first mandrel heated condition where the first mandrel right end surface and the first mandrel left end surface move away from each other. The first primary fold-over portion and the secondary primary fold over portion are thereby moved such that wrinkles are pulled out of said primary lay-up surface.

16 Claims, 2 Drawing Sheets

MANDREL WITH DIFFERENTIAL IN THERMAL EXPANSION TO ELIMINATE WRINKLES IN PLY

RELATED APPLICATIONS

This application is related to co-pending application Ser. No. 10/904,717 filed on Nov. 24, 2004.

TECHNICAL FIELD

The present disclosure relates generally to an aircraft stringer lay-up assembly and more particularly to an apparatus and method for reducing the presence of wrinkles in a primary lay-up surface of a composite aircraft stringer.

BACKGROUND

Aircraft components such as stringers have become complex in design and shape due to developing aircraft designs. The complexity of shape in combination with a need for decreased weight/strength ratios requires the use of alternate construction technologies. For this reason, aircraft designers have turned to the use of composite ply assemblies for the manufacture of aircraft stringers. In these manufacturing scenarios, a material ply impregnated with epoxy or similar substance is layed-up onto a mandrel shaped to generated the complex shape. The composite ply assembly is then cured to generate a composite component with the desired complex shape.

The nature of laying up material plies onto complex shaped mandrels, however, generates a plurality of manufacturing concerns and issues. One of such issues is the generation of wrinkles in the lay-up surfaces of the final component. These wrinkles can interfere with final assembly and may even in some circumstances weaken the strength of the final component. This is clearly undesirable. In addition, the complex shaping of the mandrels often places limits on the mandrel construction techniques. Standard metal fabrication of mandrels often is overly costly and cannot reliably result in the precise complex structures required for modern aircraft design requirements. The use of composite mandrel assemblies partially alleviates these concerns, but in turn results in costly mandrels that are easily damaged and do not have the lifespan of the metal fabricated counterparts.

It would, therefore, be highly desirable to have an aircraft stringer lay-up assembly with improved removal of wrinkles from the lay-up surfaces. It would additionally be highly desirable to have such an apparatus and method that was compatible with inexpensive and increased lifespan mandrels.

SUMMARY

It is therefore an object to provide an aircraft stringer lay-up assembly with improved wrinkle removal characteristics. It is further object to provide an apparatus and method for the removal of wrinkles in aircraft stringer lay-up assemblies with improvements to cost and lifespan.

In accordance with the objects, an aircraft stringer lay-up assembly is provided comprising a first mandrel element having a first mandrel material with a first mandrel coefficient of thermal expansion. A composite ply assembly is laid up onto the first mandrel element to generate a primary lay-up surface. The composite ply assembly comprises a first primary fold-over portion folded onto to the first mandrel right end surface. A second primary fold over portion folds over to the first mandrel left end surface. The first mandrel coefficient of thermal expansion is adapted such that the first mandrel is movable between a first mandrel normal condition and a first mandrel heated condition where the first mandrel right end surface and the first mandrel left end surface move away from each other. The first primary fold-over portion and the secondary primary fold over portion are thereby moved such that wrinkles are pulled out of said primary lay-up surface.

Other objects and features will become apparent when viewed in light of the detailed description and preferred embodiment when taken in conjunction with the attached drawings and claims.

DESCRIPTION OF PREFERRED EMBODIMENTS

Figure 1:
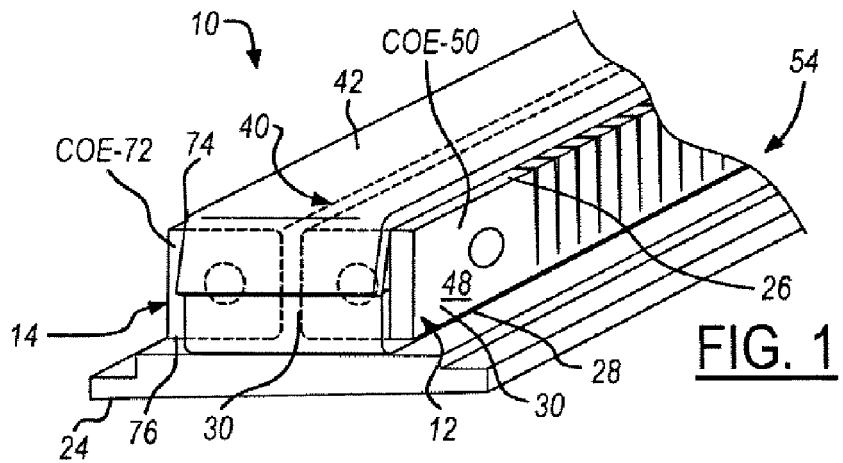
FIG. 1 is an illustration of an aircraft stringer lay-up assembly in accordance with a preferred embodiment.

Referring now to FIG. 1, which is an illustration of an aircraft stringer lay-up element 10 in accordance with the present invention. The aircraft stringer lay-up element 10 includes a first mandrel element 12, preferably an elongated metal beam element 14 as shown. The present invention can further include a second mandrel element 16. The first mandrel element 12 can include a plurality of rigidity reducing first slots 18, preferably produced through wire electrical discharge machining, formed over a first mandrel length 20 and protruding partially through a first mandrel depth 22 as described in the co-pending application Ser. No. 10/904,717 filed Nov. 24, 2004 herein incorporated by reference. The mandrels 12, 16 are thereby free to conform to a contoured curing block 24 on which they may be laid.

The first mandrel element 12 is comprised of a first mandrel vertical upper surface 26, a first mandrel vertical lower surface 28, two first mandrel side surfaces 30, a first mandrel right end surface 32 located at a first mandrel right end 34 and a first mandrel left end surface 36 located at a first mandrel left end 38. A composite ply assembly 40 is laid-up onto said first mandrel element 12 to generate a primary lay-up surface 42. Although a variety of primary lay-up surfaces 42 are contemplated, one embodiment contemplates the primary lay-up surface 42 to be coincident with the first mandrel vertical upper surface 26. The composite ply assembly 40 further includes a first primary excess portion 44 (also referred to as a fold-over portion) and a second primary fold over portion 46. The first primary excess portion 44 is affixed to the first mandrel right end 34. In the case of using fold over embodiment, the first primary fold-over portion 44 is folded over to engage the first mandrel right end surface. Similarly the second primary excess portion 46 is affixed to the first mandrel left end 38 by folding over the second primary fold-over portion 46 onto the first mandrel left end surface 36.

Figure 2:
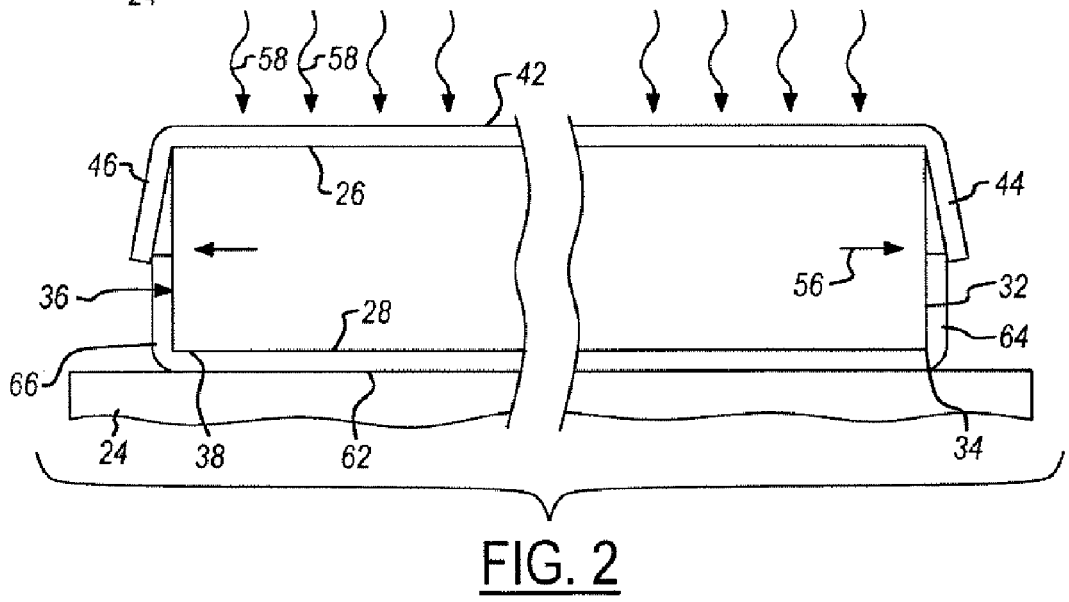
FIG. 2 is a detailed illustration of the aircraft stringer lay-up assembly illustrated in FIG. 1, the assembly illustrated subjected to a first mandrel heated condition.

The present disclosure contemplates that the fist mandrel element 12 is comprised of a first mandrel material 48 having a first mandrel coefficient of thermal expansion (COE) 50. The composite ply assembly 40 is preferably comprised of a composite COE 52 significantly less than the first mandrel COE 50. This allows the first mandrel 12 to be moved between a first mandrel normal condition 54 (FIG. 1) and a first mandrel heated condition 56 (FIG. 2). The first mandrel heated condition 56, as a result of the first mandrel COE 50 causes the first mandrel right end surface 32 to move away from the first mandrel left end surface 34 such that the primary lay-up surface 42 of the composite ply assembly 40 is pulled taught and any wrinkles during lay-up are removed.

Figure 5:
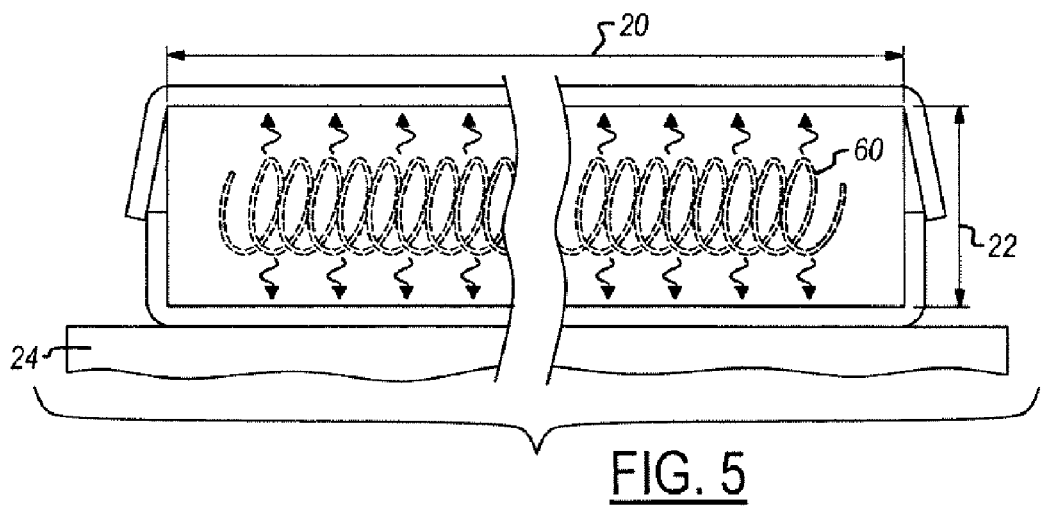
FIG. 5 is a detailed illustration of the aircraft stringer lay-up assembly illustrated in FIG. 1, the assembly illustrated including a heating element positioned within the first mandrel element.
Figure 6:
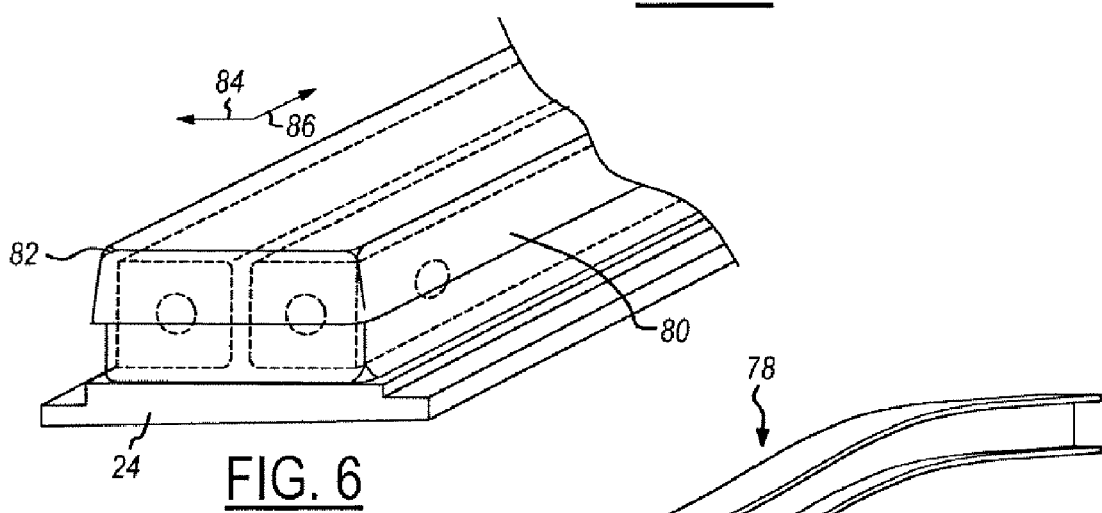
FIG. 6 is a detailed illustration of the aircraft stringer lay-up assembly illustrated in FIG. 1, the assembly illustrated including a perpendicular excess portion.

The heat required to move the first mandrel element 12 from the first mandrel normal condition 54 to the first mandrel heated condition 56 may be introduced in a variety of fashions. In one embodiment, the heat is provided through the curing heat 58 used to cure the composite ply assembly 40. In other embodiments, however, such as the example shown in FIG. 5, the heat may be provided independent of curing such as through the use of a heating element 60 positioned within the first mandrel element 12. This allows the aircraft stringer lay-up element 10 to be implemented in lay-up configurations wherein the composite ply assembly 40 is cured without heat. In still another considered embodiment, the heating element 60 (FIG. 5) can be used as a source of heat for controlling size of the first mandrel element 12 in addition to being a source of the curing heat 58 used to cure the composite ply assembly 40.

Figure 3:
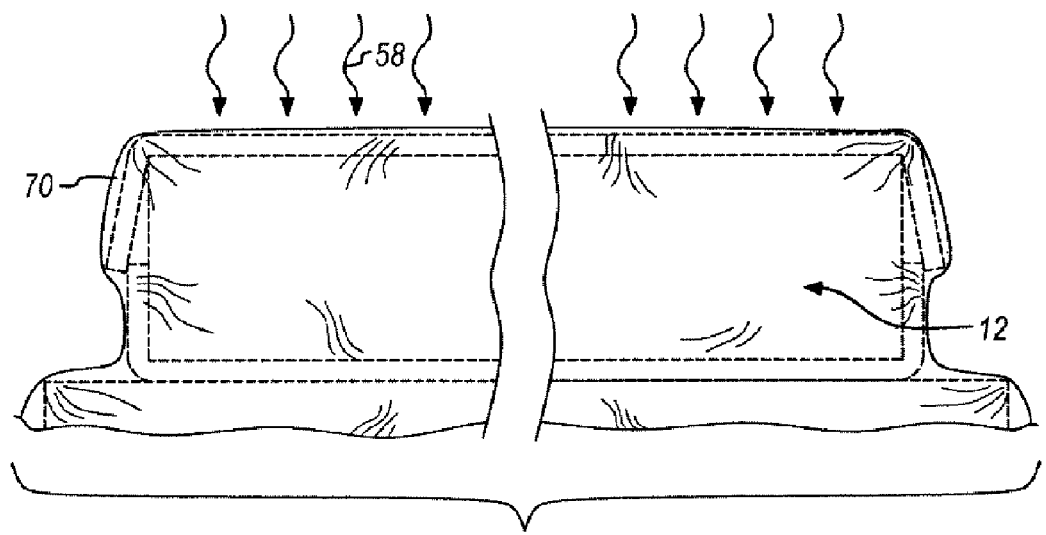
FIG. 3 is an illustration of the aircraft stringer lay-up assembly illustrated in FIG. 1, the assembly illustrated including a vacuum bag assembly.
Figure 4:
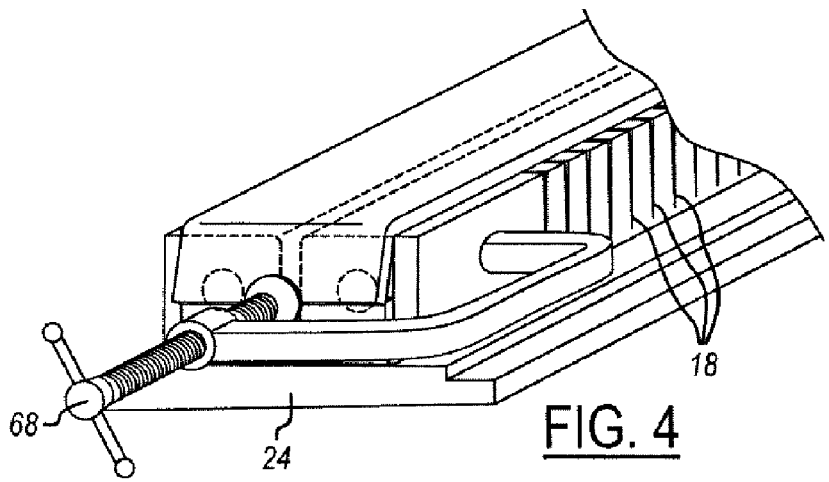
FIG. 4 is a detailed illustration of the aircraft stringer lay-up assembly illustrated in FIG. 1, the assembly illustrated including a clamping assembly.

The aircraft stringer lay-up element 10 may be further improved by including a secondary lay-up surface 62 coincident with the first mandrel vertical lower surface 32. The composite ply assembly 40 thereby includes a first secondary excess (fold-over) portion 64 and a second secondary excess (fold-over) portion 66 affixed/folded over the first mandrel right end surface 32 and fist mandrel left end surface 36 respectively. The secondary excess portions 64,66 engage the primary excess portions 44,46 such that a stronger stretching force can be induced in the primary lay up surface 42 and the secondary lay-up surface 62. Although fold-over technology may be utilized to secure excess portions, a clamping assembly 68 (see FIG. 4) or a vacuum bag assembly 70 (FIGS. 3 and 5) may be utilized as means to adequately secure that composite ply assembly 40 to the first mandrel element 12 such that expansion of the mandrel element 12 due to its first mandrel COE 50 can be harnessed to remove wrinkles.

Figure 7:
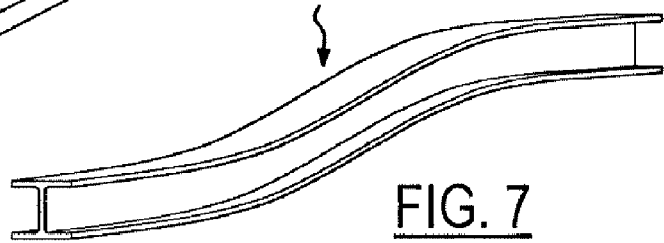
FIG. 7 is an illustration of a resultant contoured I-beam element as a result of the aircraft stringer lay-up assembly illustrated in FIG. 1.

The second mandrel element 16 should similarly have a second mandrel coefficient of thermal expansion 72 which preferably matches said first mandrel COE 50. The second mandrel element 16 is preferably placed adjacent the first mandrel element 12 such that the composite ply assembly 40 may be laid up between the two mandrels 12,16 in addition to over the first mandrel upper vertical surface 26 and a second mandrel upper vertical surface 74, and over a first mandrel lower vertical surface 28 and a second mandrel lower vertical surface 76. In this fashion, a contoured I-beam element 78 is formed. The fold-over portions 44,46,64,66 (or excess portions) can be removed (trimmed) after curing such that a pristine contoured I-beam element 78 is produced (see FIG. 7).

In still another embodiment, the composite ply assembly 40 may further include a first perpendicular fold-over portion 80 and a second perpendicular fold-over portion 82 perpendicular to the primary fold over portions 44,46. These perpendicular fold over portions 80,82 are folded over or affixed to the first mandrel side surfaces 30 opposing each other. This results in the primary lay-up surface 42 being stretched in a first planar direction 84 and a second planar direction 86 such that addition wrinkle removal is provided.

While one or more embodiments have been described in this disclosure, it is to be understood that the specific mechanisms and techniques which have been described are merely illustrative. Numerous modifications may be made to the methods and apparatus described without departing from the spirit and scope the appended claims.

What is claimed is:

1. A method of laying up an elongated contoured aircraft stringer comprising:

manufacturing a first mandrel element from a first mandrel material having a first mandrel coefficient of thermal expansion, said first mandrel element having a first mandrel vertical upper surface, a first mandrel vertical lower surface, two first mandrel side surfaces, a first mandrel right end surface and a first mandrel left end surface, said first mandrel right end surface and said first mandrel left end surface having a smaller surface area than said side surfaces, said vertical upper surface and said vertical lower surface of said first mandrel, said mandrel vertical upper surface and said vertical lower surface each including an elongated curved contoured bend line, laying up a composite ply assembly onto said first mandrel element to generate a primary lay-up surface, said composite ply assembly being longer than said first mandrel element, said composite ply assembly comprising a first primary fold-over portion and a second primary fold over portion extending from said primary lay-up surface;

folding over said first primary fold-over portion onto said first mandrel right end surface to partially engage the first mandrel right end surface;

folding over said second primary fold over portion onto said first mandrel left end surface to partially engage the first mandrel left end surface to help maintain tension, said composite ply assembly being dimensioned so as to conform to the shape of the first mandrel element following heating of said first mandrel element;

heating said first mandrel element through the use of a heating element positioned within said first mandrel element so that said first mandrel moves between a first mandrel normal condition to a first mandrel heated condition, said first mandrel coefficient of thermal expansion moving said first mandrel right end surface away from said first mandrel left end surface as said mandrel enters said first mandrel heated condition, said first primary fold-over portion moving away from said secondary primary fold-over portion in response to relative movement of said first mandrel right end surface and said first mandrel left end surface, whereby the difference in thermal expansion between the first mandrel and said ply assembly increases the tension in the composite ply assembly in the heating step and any wrinkles are pulled out of said primary lay-up surface; and curing said composite ply assembly to form a contoured composite stringer element corresponding along essentially its entire length to the elongated curved contoured bend line and therewith to the shape of said mandrel.

2. A method as described in claim 1, wherein said first coefficient of thermal expansion is significantly greater than a composite coefficient of thermal expansion of said composite ply assembly.

3. A method as described in claim 1, further comprising:
   laying up said composite ply assembly onto a secondary lay-up surface on said first mandrel element;
   folding over a first secondary fold-over portion onto said first mandrel right end surface;
   folding over a second secondary fold-over portion onto said first mandrel left end surface.

4. A method as described in claim 3, further comprising:
   engaging said first primary fold-over portion with said first secondary fold-over portion; and
   engaging said second primary fold over portion with said second secondary fold-over portion.

5. A method as described in claim 1, further comprising: clamping said first primary fold-over portion to said first mandrel right end surface.

6. A method as described in claim 1 further comprising: placing said first mandrel element and said composite ply assembly into a vacuum bag assembly; and sealing said vacuum bag assembly such that said composite ply assembly is pressed against said first mandrel element during curing.

7. A method as described in claim 1 further comprising: heating said first mandrel element by curing said composite ply assembly.

8. A method as described in claim 1 further comprising: forming a plurality of rigidity reducing first elements in said first mandrel element along a first mandrel length; placing said first mandrel element on a contoured curing block, said plurality of rigidity reducing first elements allowing said first mandrel element to conform to said contoured curing block.

9. A method as described in claim 8 wherein said plurality of rigidity reducing first element are formed using wire electrical discharge machining.

10. A method as described in claim 1 further comprising: placing a second mandrel element adjacent said first mandrel element; laying up said composite ply assembly between said first mandrel element and said second mandrel element such that said composite ply assembly extends over a first mandrel upper vertical surface, a second mandrel upper vertical surface, a first mandrel lower vertical surface, and a second mandrel lower vertical surface such that said composite ply assembly comprises a contoured curved I-beam element corresponding along essentially its entire length to the shape of the mandrel.

11. A method as described in claim 10 further comprising: trimming off said first primary fold-over portion and said second primary fold-over portion after curing said composite ply assembly.

12. A method as described in claim 11, further comprising:
   folding a first perpendicular fold-over portion of said composite ply assembly from said primary lay-up surface to one of said first mandrel side surfaces;
   folding a second perpendicular fold-over portion of said composite ply assembly from said primary lay-up surface to another of said first mandrel side surfaces;
   heating said first mandrel element such that said primary lay-up surface is stretched in two planar directions.

13. A method of laying up an elongated contoured aircraft stringer comprising:
   manufacturing a first mandrel element from a first mandrel material having a first mandrel coefficient of thermal expansion, said first mandrel element having a first mandrel vertical upper surface, a first mandrel vertical lower surface, two first mandrel side surfaces, a first mandrel right end surface and a first mandrel left end surfaces, said first mandrel right end surface and said first mandrel left end surface having a smaller surface area than said side surfaces, said vertical upper surface and said vertical lower surface of said first mandrel;
   laying up a composite ply assembly onto said first mandrel element to generate a primary lay-up surfaces said composite ply assembly being longer than said first mandrel element, said composite ply assembly comprising a first primary excess portion and a second primary excess portion extending from said primary lay-up surface;
   attaching said first primary excess portion onto said first mandrel right end to partially engage the first mandrel right end; attaching said second primary excess portion onto said first mandrel left end to partially engage the first mandrel left end to help maintain tension, said composite ply assembly being dimensioned so as to conform to the shape of the first mandrel element following heating of said first mandrel element, said mandrel vertical upper surface and vertical lower surface each including an elongated curved contoured bend line;
   heating said first mandrel element through the use of a heating element positioned within said first mandrel element so that said first mandrel moves between a first mandrel normal condition to a first mandrel heated condition, said first mandrel coefficient of thermal expansion moving said first mandrel right end away from said first mandrel left end as said mandrel enters said first mandrel heated condition, said first primary excess portion moving away from said secondary primary excess portion in response to relative movement of said first mandrel right end and said first mandrel left end whereby the difference in thermal expansion between the first mandrel and said composite ply assembly in the heating step increases the tension in the composite ply assembly such that wrinkles are pulled out of said primary lay-up surface; and curing said composite ply assembly to form a composite stringer element corresponding along essentially its entire length to the elongated contoured curved bend line and therewith to the shape of the mandrel.

14. A method as described in claim 13, further comprising:
   forming a plurality of rigidity reducing first elements in said first mandrel element along a first mandrel length;
   placing said first mandrel element on a contoured curing block said plurality of rigidity reducing first elements allowing said first mandrel element to conform to said contoured curing block.

15. A method as described in claim 13, further comprising: clamping said first primary excess portion to said first mandrel right end.

16. A method as described in claim 15 further comprising: clamping said first primary excess portion using a vacuum bag assembly.

* * * * *

UNITED STATES PATENT AND TRADEMARK OFFICE
CERTIFICATE OF CORRECTION

PATENT NO. : 7,588,655 B2  Page 1 of 1
APPLICATION NO. : 10/904709
DATED : September 15, 2009
INVENTOR(S) : Pham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 865 days.

Signed and Sealed this

Twenty-first Day of September, 2010

David J. Kappos
*Director of the United States Patent and Trademark Office*